No. 11,997.
Reissued May 27, 1902.
E. THOMSON & J. G. CALLAN.
INSULATED CONDUCTOR.
(Application filed Apr. 24, 1902.)
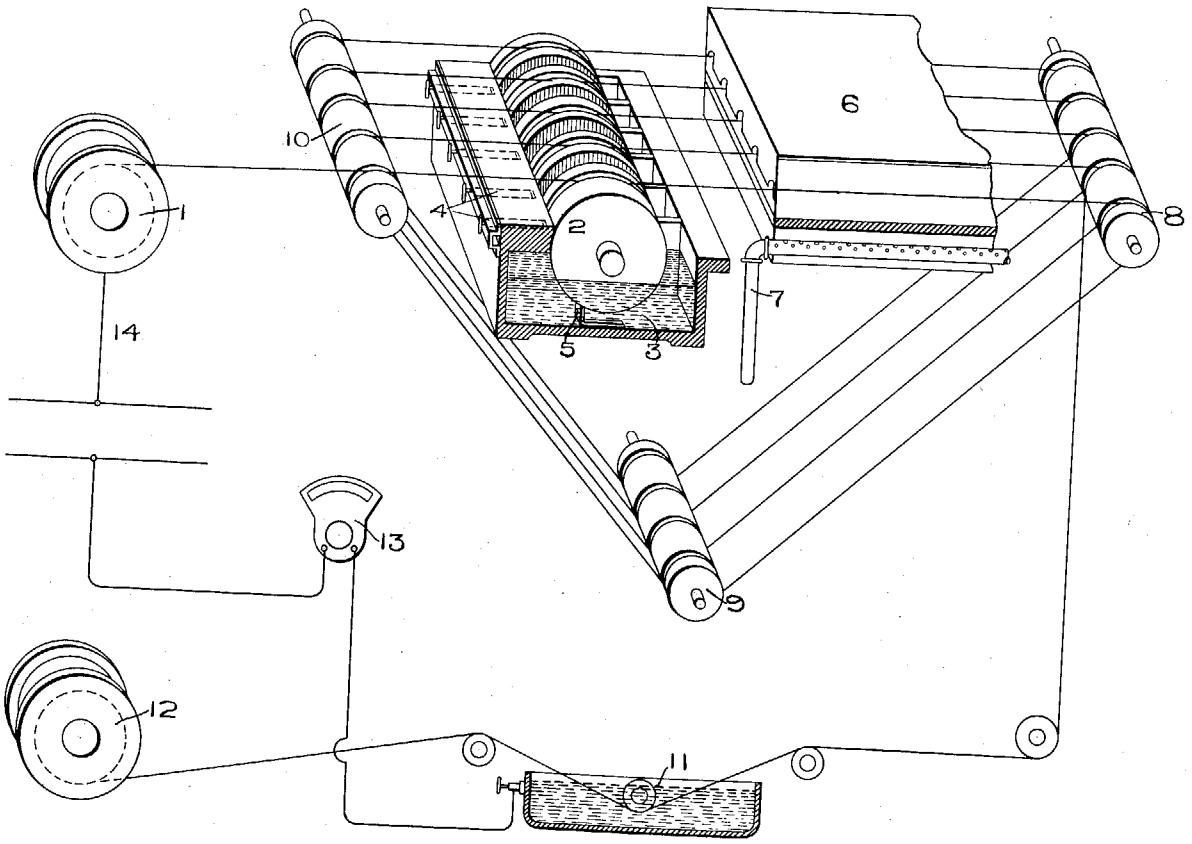
Witnesses:
Benjamin B. Hull,
Helen Orford
Inventors:
Elihu Thomson
John G. Callan,
by Albert G. Davis Att'y.

UNITED STATES PATENT OFFICE.

ELIHU THOMSON, OF SWAMPSCOTT, AND JOHN G. CALLAN, OF LYNN, MASSACHUSETTS, ASSIGNORS TO GENERAL ELECTRIC COMPANY, A CORPORATION OF NEW YORK.

INSULATED CONDUCTOR.

SPECIFICATION forming part of Reissued Letters Patent No. 11,997, dated May 27, 1902.

Original No. 695,127, dated March 11, 1902. Application for reissue filed April 24, 1902. Serial No. 104,734.

*To all whom it may concern:*

Be it known that we, ELIHU THOMSON, residing at Swampscott, and JOHN G. CALLAN, residing at Lynn, county of Essex, State of Massachusetts, citizens of the United States, have invented certain new and useful Improvements in Insulated Conductors, (Case No. 2,060,) of which the following is a specification.

The object of this invention is to provide an insulating-covering for an electric conductor which will have high insulation, will be proof against heat and moisture, and will have a minimum thickness with relation to the size of the conductor.

Conductors are commonly insulated by a winding or braiding of cotton, silk, or other fibrous insulating material or by a solid insulating compound, or both. Fibrous coverings, although heat-resisting to a considerable degree, are not moisture-proof, while the compound coverings usually employed not only greatly increase the thickness of the conductor, but do not hold up under even moderate heat. We produce a wire coated with a thin skin of a material flexible, tough, not easily inflammable, and capable of resisting a comparatively high degree of heat, these properties rendering it suitable for magnet-coils and other electrical purposes where the temperature may range as high as 100° to 150° centigrade. We carry out our invention by coating the wire with a number of adherent films of a relatively non-inflammable cellulose compound. Compounds of cellulose have heretofore been used—such, for example, as collodion. This, however, produces an insulation unsatisfactory in several respects. It is extremely combustible and under appropriate conditions explosive, it will not long endure a temperature much in excess of 75° centigrade, and even at temperatures lower than this it is liable to undergo slow changes, which greatly impair its insulating properties and may give rise to nitric compounds capable of acting on the wire, the latter being of particular importance in the case of very fine insulated wire only a few mils. in thickness. It has also been proposed to use pure structureless cellulose made by reversion from one of its compounds applied to naked wire. We have discovered that other compounds of cellulose—such, for example, as the acetates or the esters, simple or mixed, derived from the other monobasic fatty acids or the aromatically-substituted fatty acids, may be successfully applied as a wire-covering. Some of these, in particular that acetyl compound generally regarded as the tetracetate, are waterproof compounds of extremely high insulating power and well adapted for electrical insulating purposes. When employed alone, however, we have found them inelastic and somewhat brittle and lacking in adhesion to the wire; but when they are mixed with a softener—such as certain essential oils, phenol, cresol, or other material having equivalent effect—they are rendered supple and are not liable to pull apart and leave bare spots if the conductor is stretched in winding or otherwise. We render the coverings uniform by applying a plurality of coatings in the form of thin films, the cellulose compound being dissolved in a solvent, preferably one very volatile, and the wire being carried through successive baths, in which the several films are deposited on the wire. We prefer to effect increased adhesion to the wire by employing a preliminary coating of some adhesive, such as Canada balsam, Venice turpentine, or rubber. By this means a wire of extremely small cross-section, as one a few mils. in thickness, may be effectively insulated, the coating being in thickness only a small fraction of the diameter of the wire and being stable in composition and in insulating properties under all ordinary conditions of exposure to heat and moisture.

The coating may be done in any suitable apparatus, the bare wire being led from a reel, preferably first through a very thin solution of Canada balsam, rubber, or other adhesive, which serves the dual purpose of dissolving any grease from the wire and covering it with a thin adherent coat, which closely binds to the wire the subsequent coats of cellulose compound. The wire is led from the adhesive-coating bath when used through a drying-box, which may contain hot air. It is then led through another bath and a primary coating of the cellulose compound applied—as, for instance, a solution of cellulose tetracetate in chloroform or other suitable solvent. We have found it advantageous to mix with this second application a quantity of Venice turpentine about equal in amount to the actual contents of cellulose acetate in the solution. This gives a coating which adheres closely to the balsam, rubber, or other adhesive film used and binds firmly to the wire the subsequent coatings of insulating cellulose compound. Second, third, fourth, or further insulating coats of the acetate in solution without the previous large admixture of Venice turpentine are applied by subsequent baths, flexibility being imparted to the coating by any of the known softeners added to the solution—such as castor-oil, phenol, cresol, the essential oils, or other materials suitable for the purpose—preference being given to those which will withstand high temperatures and that do not easily volatilize. They must not undergo decomposition in the presence of the metal of the wire. We have achieved good results by adding to the solution a softener composed of five parts, by weight, of castor-oil and fifty of phenol for each hundred parts of solid cellulose acetate contained.

In the accompanying drawing is diagrammatically illustrated an apparatus for coating wire in accordance with our improvements.

1 represents a wire-reel from which the wire is led across a grooved wheel 2, dipping in the coating-bath. A number of these wheels are placed side by side, dipping in troughs containing solutions of the several coating compounds. The wire passes tangentially across a groove in the top of the wheel, the bottom of the wheel dipping in the coating material contained in a tank 3, divided into the desired number of chambers by transverse partitions. A scraper 4 may be employed to remove the excess of material from the coating-groove, which picks up the compound from the bath. A scraper 5 may also be employed in the bath to remove any dirt carried around on the wheel. After leaving each coating-wheel the wire passes through a hot-air box 6, which may be heated by gas-jets leading from the pipe 7. After applying the first coat of balsam, rubber, or other adhesive the wire is led through the drying-box and over guide-sheaves 8, 9, and 10 back to the coating-wheel, where the cellulose compound is applied, after which it passes again through the drying-box and over guide-sheaves to the third coating-wheel, and so on in order until all the coats have been applied, after which it is led through a testing-bath 11, of mercury or other fluid conductor of sufficient depth around the wire, and wound on a shipping-reel 12. The mercury-bath is electrically connected with one terminal of a voltmeter 13, the other terminal of which connects with a circuit of the desired voltage. The wire on the reel 1 is electrically connected by a conductor 14 with the other side of the testing source. Thus in case there is any defective spot in the insulation the voltmeter gives a visible indication, and the defect may be cured before the wire is reeled. A suitable audible signal may replace or supplement the voltmeter.

We have attained the best results with the cellulose ester known as "tetracetate of cellulose." We do not, however, confine our invention specifically to this material. Other cellulose esters not readily inflammable might also be employed—as, for example, the esters of the other monobasic fatty acids, formic, propionic, butyric, &c., the esters of the aromatically-substituted fatty acids, such as benzoic, phenyl-acetic or phenyl-propionic, or the esters of oleic, angelic, and several other acids not included in the classes mentioned. The structureless insoluble modification of cellulose recovered through the decomposition of viscose or cellulose xanthate might also be used. A similar covering might be made for insulating purposes on other forms of material than wires—as, for example, a film might be deposited on condenser-plates and serve as the dielectric of the condenser.

What we claim as new, and desire to secure by Letters Patent of the United States, is—

1. An insulating compound consisting of an adherent non-explosive cellulose ester attached to a support.

2. An insulating compound consisting of a non-explosive cellulose ester attached to a support by an adhesive binder.

3. An insulated conductor coated with a non-explosive cellulose ester.

4. An insulated conductor coated with a cellulose ester bound to the conductor by an adhesive compound.

5. An insulated conductor coated with a waterproof heat-resisting compound of structureless cellulose.

6. An insulated conductor coated with an acetate of cellulose.

7. An insulated conductor coated with tetracetate of cellulose.

8. An insulated conductor coated with a plurality of films of tetracetate of cellulose.

9. An insulated conductor covered with a film of rubber next the metal and an adherent covering of cellulose tetracetate over the rubber.

In witness whereof we have hereunto set our hands this 11th day of April, 1902.

ELIHU THOMSON.
JOHN G. CALLAN.

Witnesses:
DUGALD McK. McKILLOP,
JOHN A. McMANUS.